United States Patent
Herman et al.

(10) Patent No.: US 11,100,616 B2
(45) Date of Patent: Aug. 24, 2021

(54) OPTICAL SURFACE DEGRADATION DETECTION AND REMEDIATION

(71) Applicant: Ford Global Technologies, LLC, Dearborn, MI (US)

(72) Inventors: David Michael Herman, Oak Park, MI (US); Venkatesh Krishnan, Canton, MI (US); Ashwin Arunmozhi, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 150 days.

(21) Appl. No.: 16/571,381

(22) Filed: Sep. 16, 2019

(65) Prior Publication Data
US 2021/0082090 A1 Mar. 18, 2021

(51) Int. Cl.
| | |
|---|---|
| *G06T 5/00* | (2006.01) |
| *G06T 7/20* | (2017.01) |
| *B60S 1/04* | (2006.01) |
| *G05D 1/00* | (2006.01) |

(52) U.S. Cl.
CPC ............... *G06T 5/006* (2013.01); *G06T 7/20* (2013.01); *B60S 1/04* (2013.01); *G05D 1/0088* (2013.01); *G05D 2201/0213* (2013.01); *G06T 2207/30252* (2013.01)

(58) Field of Classification Search
CPC . G06T 5/006; G06T 7/20; G06T 2207/30252; G05D 2201/0213; G05D 1/0088; B60S 1/04
See application file for complete search history.

(56) References Cited

U.S. PATENT DOCUMENTS

2020/0213581 A1* 7/2020 Lu .................... G06T 7/0004

* cited by examiner

*Primary Examiner* — Matthew C Bella
*Assistant Examiner* — Kaleb Tessema
(74) *Attorney, Agent, or Firm* — Frank Lollo; Eversheds Sutherland (US) LLP (57) ABSTRACT

Optical surface degradation detection and remediation systems, devices, and methods are provided herein. An example method includes tracking a first object within images of an area of interest obtained over a period of time by an image sensor of a vehicle during vehicle movement; tracking a light source within the area of interest; determining a change in relative reflective intensity of the first object using the images, based on a light source angle formed between the light source and an optical plane of an optical surface the vehicle, the change in relative reflective intensity being indicative of veiling glare of the optical surface; and activating a remediating measure in response to the veiling glare.

20 Claims, 5 Drawing Sheets

OPTICAL SURFACE DEGRADATION DETECTION AND REMEDIATION

TECHNICAL FIELD

The present disclosure relates to systems and methods that detect and, in some instances, remediate effects of veiling glare or lens flare produced by the present degraded state of optical surfaces in vehicles.

BACKGROUND

Veiling glare is defined as light that has been reflected or scattered out of an image forming beam which ultimately finds its way to an image plane. Veiling glare may not form an image but may be fairly uniformly distributed over the image plane. Thus, it gives the appearance of looking through a fog (such as lens flare) and the effect of reducing image contrast. Veiling glare can reduce the effectiveness of camera imaging systems mounted on vehicles and perception algorithms. Such glare may be caused by obstructions on the outer optical surfaces of automotive optics, such as windshield surfaces or camera lens cover surfaces. In automotive applications, such obstructions may occur in operating environments where dust and other materials may cover the optical surface and result in veiling glare. In addition, other sensors types which utilize active lighting, such as time-of-flight (TOF) cameras or light detection and ranging (LIDAR), may experience a decrease in optical performance due to an increased noise floor resulting in decreased maximum detection at range or increased error in estimating distance. This decrease in optical performance may also affect the ability to resolve dark and/or far objects in systems such as advanced driver assistance systems (ADAS) or autonomous vehicles (AV).

In addition, there are a number of common driving environments or use cases which result in increased veiling glare challenges where due to the angle of the light field the effect of veiling glare is more pronounced. Some of those include entering a tunnel or driving at night time with street lights while the windshield is dirty or scratched. Such scenarios may result in difficulty in detecting objects which appear darker than the intensity of the veiling glare.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems, devices, and methods disclosed herein are configured to detect veiling glare or lens flare due to degradation of an optical surface of a vehicle. To be sure, embodiments herein are not limited to only veiling glare detection and the present disclosure can include the detection and remediation of veiling glare and/or lens flare. In general, if veiling glare is referenced, it will be assumed that lens flare may also be considered unless specifically indicated otherwise. In some embodiments, the systems, devices, and methods herein can be configured to detect veiling glare or lens flare and activate a remediating action in response thereto in order to rectify optical surface degradation.

In general, the present disclosure utilizes knowledge of functional/physics relationship between an optical surface and an angle of incidence of the light source (also referred to as light source angle) to improve detection and measurement of obstructions on the optical surface. The term obstruction should be understood to include any temporary or permanent degradation to an optical surface. Degradation can be due to surface defects such as scratches or pitting, but can also be due to foreign object material such as water, dust, dirt, mold, insects, and other similar foreign object material. To be sure, the systems and methods disclosed herein can also be used to quantify an amount of obstructions present on an optical surface that are generally undetected by human observation. Obstructions can also be created through degradation processes such as ultraviolet light degradation and the like. Veiling glare may impact images obtained by a camera or other light sensor in a vehicle, or may generally obscure driver visibility.

For example, veiling glare could be caused by foreign material on a windshield. A camera positioned behind the windshield may be deleteriously affected by veiling glare caused by foreign material on the windshield. In another example, foreign material, such as dust, can be found on the lens of a camera.

Stated otherwise, in some embodiments, the present disclosure provides for the detection and quantification of obstructions on an optical surface (e.g. dust on a windshield) that result in veiling glare during operation. Detection of veiling glare can be used as a trigger or condition to actuate the cleaning systems or modify ADAS/AV perception and planning algorithms, as well as system level responses such as deactivating ADAS features.

In some embodiments, systems, devices, and methods herein may utilize knowledge of an area of interest during motion of the vehicle, such as the vehicle entering/exiting a tunnel or forward motion in proximity to street lights, to assist in quantifying a magnitude of the veiling glare. The systems, devices, and methods herein may infer that the magnitude of the veiling glare is sensitive to the relative orientation of the light source and optical surface (defined by an optical plane). To be sure, the light source may be from a single origin or may arise from many sources including, but not limited to albedo, sky dome, sun, infrastructure lighting, reflective lighting, and so forth.

In addition, a vehicle may track objects based on contrast (e.g., dark and light objects) in an area of interest time during changes in the relative orientation of the light source. In some embodiments, a plurality of sensor inputs are used to synthesize contrast determinations. For example, cameras, infrared sensors, and other similar contrast detecting sensors can be used.

As the light source's relative orientation changes the vehicle may monitor the original and current relative reflective intensity of the objects to detect veiling glare level and identify conditions such as a nominal or dirty windshield. Upon detection of veiling glare, one or more vehicle systems may be actuated to reduce the impact or the root cause of the veiling glare.

The systems, devices, and methods herein can determine veiling glare based on one image, as well as in multiple images obtained over a period of time to improve detection and measurement. In some embodiments, the present disclosure can involve tracking objects in images obtained over a period of time. The objects can be tracked and contrast of the objects can be observed over the period of time (e.g., lightness versus the darkness of objects). In addition, a light source, such as a streetlight or the Sun can be tracked and a light source angle can be determined relative to an optical plane of an optical surface. Veiling glare may be determined from a change in relative reflective intensity of objects based on the light source angle formed between the light source and the optical plane of an optical surface the vehicle. In some embodiments, when veiling glare is detected, the systems, devices, and methods herein can remediate the veiling glare through actuation of a cleaning assembly, such as dispensing of windshield wiper fluid and actuation of windshield wipers when optical surface includes a front or rear windshield of the vehicle. To be sure, the veiling glare detected in some embodiments relates to localization of veiling glare from the vantage point of a camera. For example, a camera has a fixed and far focal length which leads to obstructions being typically out of focus.

In another example, a parameter, attribute, or action of an ADAS/AV vehicle system can be modified to remediate the veiling glare. For example, a velocity of the vehicle could be reduced when veiling glare is identified. The efficacy of remediation operations, such as windshield cleaning can be verified in some embodiments. In other embodiments, root causes of veiling glare can be determined when images from a plurality of image sensors are used. In one or more embodiments, a neural network can be utilized to identify or infer the root causes of veiling glare.

Illustrative Embodiments

Figure 1:
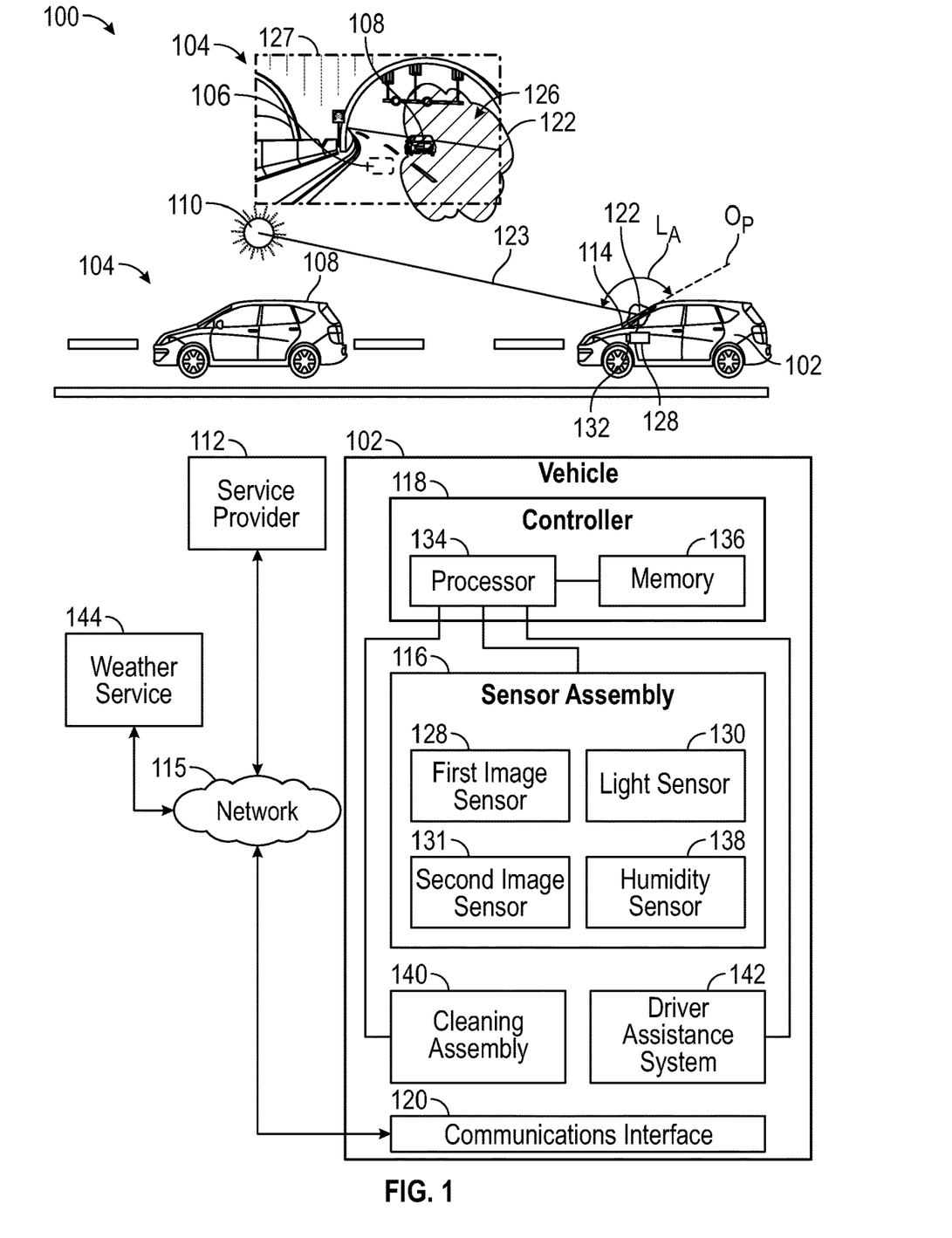
FIG. 1 depicts an illustrative architecture in which techniques and structures for providing the systems, devices, and methods disclosed herein may be implemented.

Turning now to the drawings, FIG. 1 depicts an illustrative architecture 100 in which techniques and structures of the present disclosure may be implemented. The illustrative architecture 100 may include a vehicle 102, an area of interest 104, one or more objects, such as object 106 and 108, a light source 110, a service provider 112, and a network 115. In general, the first object 106 could include a road surface and the second object 108 could include a bumper of a vehicle. Other objects can likewise be identified and tracked as disclosed herein.

Components of the architecture 100, such as the vehicle 102 and service provider 112 may communicate with one another over a network 115. The network 115 may include any one or a combination of multiple different types of networks, such as cable networks, the Internet, wireless networks, and other private and/or public networks. In some instances, the network 115 may include cellular, Wi-Fi, or Wi-Fi direct.

In general, the vehicle 102 can comprise any vehicle that may comprise an optical surface 114, a sensor assembly 116, a controller 118, and a communications interface 120 (an optional feature for some embodiments). In various embodiments, the optical surface 114 includes a front or rear windshield of the vehicle 102. For purposes of brevity and clarity, examples provided herein may reference the optical surface 114 as the front windshield of the vehicle 102. The optical surface can include other surfaces within the vehicle 102 as will be discussed in greater detail herein.

Veiling glare 122 may be produced when a beam of light 123 emitted by the light source 110 interacts with and is scattered by foreign objects or obstructions 126 on the optical surface 114. Any foreign object that is present on the optical surface 114 may cause veiling glare. Examples of foreign objects/material can include but are not limited to dust, cracks, pits, or other similar artifacts. The amount, opacity, and/or reflectivity of the obstructions 126 can produce varying amounts of veiling glare.

In some embodiments, the sensor assembly 116 comprises a first image sensor 128 and a light sensor 130. In optional embodiments, the sensor assembly 116 can comprise a second image sensor 131. Additional details regarding the use of the second image sensor 131 are provided in greater detail infra. An image 127 captured by the first image sensor 128 includes the objects 106 and 108 with veiling glare 122 present due to foreign objects or obstructions 126 on the optical surface 114.

In some embodiments, the first image sensor 128 could comprise any of a camera, a time-of-flight (TOF) camera, a plenoptic camera, LIDAR, or other similar system which may be deleteriously affected by veiling glare. The veiling glare can affect a lens 132 of the first image sensor 128 as the camera obtains images of the area of interest 104 during vehicle operation. Thus, in some instances, the lens 132 may be understood to be an example of an optical surface for purposes of the present disclosure. Other examples could include a filter, a beam splitter, or other equivalent structures.

In other embodiments, the first image sensor 128 can be affected by veiling glare 122 due to its position behind the optical surface 114. That is, while in some embodiments, veiling glare may be attributable to obstruction or artifacts on the lens 132 of the first image sensor 128, veiling glare may occur on the optical surface 114. In some embodiments, veiling glare may be attributable to obstruction/artifacts on both the lens 132 of the first image sensor 128 and the optical surface 114 of the vehicle 102. Additionally, the systems, devices, and methods herein allow for determinations as to whether the veiling glare is due to obstruction/artifacts on the lens 132 of the first image sensor 128 and/or the optical surface 114 of the vehicle 102 using remediation and validation processes, which are described in greater detail herein.

A differentiation can also be made between lens flare and veiling glare. Lens flare occurs when light hits an optical component such as compound lens structure or sensor die packaging and is scattered within the optical components until ultimately being absorbed by the sensor. This can cause image artifacts, known as veiling glare but they are structured due to the symmetry of the optical component scattering and are expressed as an angular function of the camera to light source angle rather than the glass angle. In some applications it may be the same angle. Assuming that lens flare is fixed, other than angular dependency, an effect can be modeled for a given optical system to generate the function. The function is then inversed to remove the lens flare to isolate the veiling glare effect only. In some cases lens flare may not be fixed. The glare it causes has a different geometric relationship with the light source and the resulting glare shows more structure then a dust layer causing veiling glare.

Figure 2A:
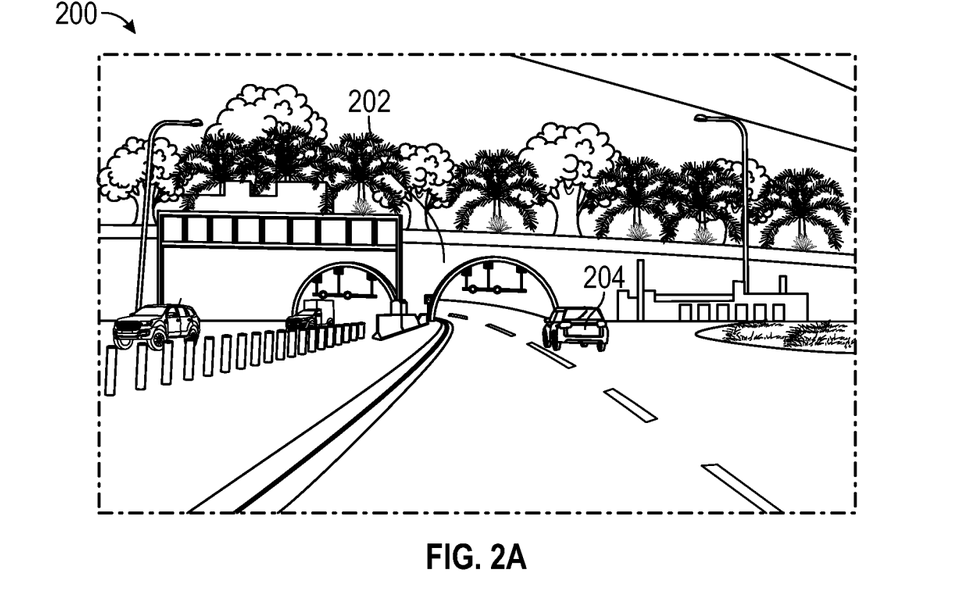
FIG. 2A-2C collectively illustrate images that collectively depict veiling glare or lens flare, and object detection.
Figure 2B:
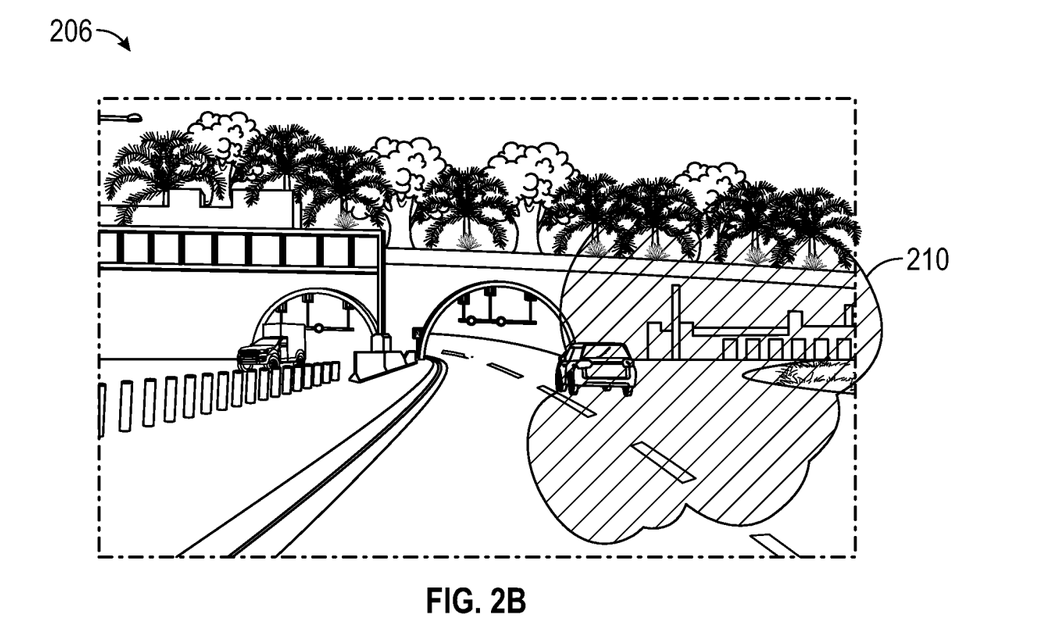
Figure 2C:
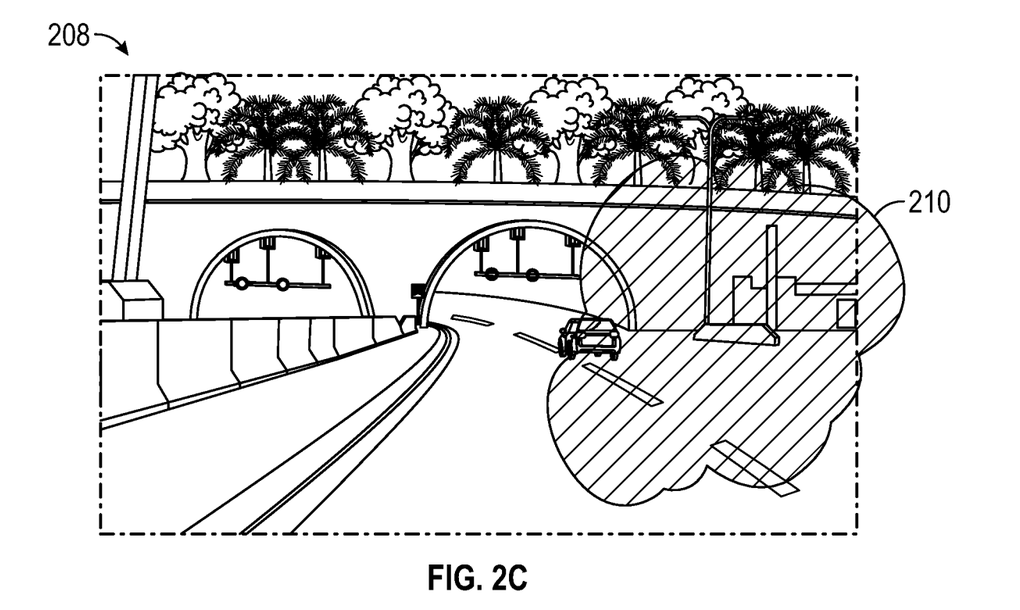

In one embodiment, the first image sensor 128 obtains photographs or other similar images such as the photographs of FIGS. 2A-2C. In these photographs, image degradation due to veiling glare is present. For example, in a first image 200 (FIG. 2A), as the vehicle passes under a bridge 202 in the area of interest, little to no veiling glare is present. An object 204, such as a vehicle can be determined and tracked. A contrast or darkness of the object 204 can be determined from the first image 200. In some embodiments, the contrast may be determined relative to a baseline or benchmark determination that is pre-programmed into the controller 118 (see FIG. 1). That is, determinations of contrast can be made relative to benchmarks to identify light versus dark objects in an image of an area of interest. In other embodiments, contrast distinctions are made using multiple images obtained over time, with a first of the images being used as a benchmark with respect to contrast. Example methods for contrast detection probability that can be used are included in Geese, Marc, Ulrich Seger, and Alfredo Paolillo. "Detection Probabilities: Performance Prediction for Sensors of Autonomous Vehicles." Electronic Imaging 2018.17 (2018): 1-14.

As the vehicle exits from under the bridge the contrast or darkness of the object 204 changes as illustrated in second image 206 of FIG. 2B and a third image 208 of FIG. 2C. Also, an area of veiling glare 210 is present in a second image 206 and increases as illustrated in the third image 208. The veiling glare 210 is increased from FIG. 2B to FIG. 2C due to changes in the light source angle as discussed above. An intensity or magnitude of the veiling glare 210 can be determined relative to changes in the relative reflectivity of the object 204 over time, such as between images FIGS. 2B and 2C. As relative lightness of the object 204 increases, it may be inferred that the veiling glare 210 has increased. This can be confirmed by identifying a relative change in the angle of the light source.

Referring back to FIG. 1, the controller 118 can be configured to process images obtained by the sensor assembly 116, calculate light source angles, and assess the presence of veiling glare, as well as other related features such as lens flare. The controller 118 may comprise a processor 134 and memory 136. The memory 136 stores instructions that are executed by the processor 134 to perform aspects of veiling glare detection and/or remediation as disclosed throughout. When referring to operations executed by the controller 118 it will be understood that this includes the execution of instructions by the processor 134.

The controller 118 can be configured to receive images from the first image sensor 128 and process the images to identify objects therein. The objects can be assessed relative to one another based on contrast. That is, the controller 118 can be configured to detect and track objects based on their relative darkness or lightness. Example objects can include cars, signage, road surface markers, and so forth. Stated otherwise, in the area of interest 104, objects with different relative intensities, such as a road surface or a black car, may be tracked to identify changes in their relative intensities over time.

The controller 118 (or specific configuration of the light sensor 130) can also determine a location/position of the light source 110, such as the Sun, relative to the optical surface 114 of the vehicle 102. The controller can determine a light source angle LA based on the determined or assessed position/location of the light source 110 in relation to the optical surface 114. More specifically, the light source angle LA is measured as the angle between the beam of light 123 and an optical plane Op, which lies in coplanar to the optical surface 114. In some embodiments, such as when the light source 110 is the Sun, a position of the Sun relative to the optical surface can be determined based on a known time of day, a heading of the vehicle, and a location of the vehicle, road grade, vehicle inclination, a position of the Sun can be determined.

In various embodiments, an installed angle of the optical surface 114 that is determined relative to a ground plane may be known from manufacturer specifications. With the known angle of optical surface 114 and the position/location of the light source 110, the controller 118 can determine the light source angle LA. In some cases the optical surface may have curvature such that the relative angle to the light source may vary along the optical surface. Stated otherwise, one or more light sources can be detected and tracked using, for example, camera-mediated detection of street lights, and/or a device (such as the controller 118) that is configured to perform indirect determination of light sources. For example, the controller 118 can utilize localization (e.g., real-time positioning) and high-definition maps to identify a relative position of the light source 110 to the optical surface 114. Some embodiments can utilize light field data or weather data obtained from a resource.

The controller 118 can be configured to calculate or infer the presence of veiling glare on the optical surface 114 as a function of relative intensities of objects (e.g., lightness/darkness), versus the light source angle LA, as a function of time across two or more images. According to some embodiments, veiling glare determinations can be made using only a single image. In general, the controller 118 can be configured to determine the relative intensities of light and dark objects in images versus the light source angle LA, over time. In embodiments related to using a single image, the controller 118 may utilize prior data of a scene, such as the reflectivity of a street sign or a dark sky in proximity to a light source for example. The controller 118 can utilize a dynamic range of the camera, the light source geometry (e.g. image boundary), the light source intensity, and/or other parameters to estimate that at the present angle of inclination the light source would produce a veiling glare and lens flare (e.g. increase in the luminosity/brightness as a function of radius from veiling glare+a function of lens flare that is a function of radius and angle (due to camera symmetry) around the light source) of some fixed amount. If the amount glare/flare, e.g. the radius of intensity/brightness increase is larger it is an indication of optical degradation. The controller 118 can also be configured to differentiate between the veiling glare and lens flare modes as well due to the structure (e.g. FFT, fast Fourier transform of flare region after conversion to polar coordinate system).

In various embodiments, the controller 118 may be configured to track a first object within an area of interest included in images of the area of interest obtained over a period of time by an image sensor (e.g., first image sensor 128) of a vehicle during vehicle movement. The controller 118 can track a light source within the area of interest. The controller 118 can be further configured to determine a change in relative reflective intensity of the first object based on a light source angle formed between the light source and an optical plane of an optical surface the vehicle. To be sure, the change in relative reflective intensity is indicative of veiling glare of the optical surface. In some embodiments, the controller 118 can also distinguish between objects being shadowed such as entering the vehicle entering the tunnel or under an overpass. The illumination on the object may change, so the controller 118 can be configured to distinguish between constant illumination conditions and varying conditions.

Table 1 includes columns having values determined from individual images obtained over time. A contrast of a road surface (e.g., first object 106) and a contrast of a car bumper (e.g., second object 108) are assessed across multiple images. The relative reflectivity, which is referred to as a change in contrast, is provided as well. This change in contrast may be indicative of the presence of veiling glare. Thus, when no relative change in contrast is determined, it can be inferred that no veiling glare is present. While the 8-bit image intensity values are utilized in Table 1, the controller 118 can also compute the luminesce of the object knowing camera/ISP properties and settings (e.g. exposure).

TABLE 1

| Road | 220 | 217 | 218 | 228 | 211 |
|---|---|---|---|---|---|
| Car bumper | 52 | 108 | 116 | 138 | 140 |
| relative change in contrast | 0% | 25% | 29% | 38% | 42% |
| % Difference | 124% | 67% | 61% | 49% | 40% |

In Table 1, it is inferred that due to the relative increase contrast, veiling glare is present on the optical surface. As contrast is changing for both objects, it can be further confirmed that veiling glare is present on the optical surface. The change in relative contrast between the objects is found to be decreasing, which is indicative of veiling glare. Specifically, the dark colored car bumper is not becoming more reflective nor has the bumper's photon flux changed but rather light scattering due to dust on the windshield is increasingly contributing to the measured image intensity or luminance in the scene.

Additionally, other computational methods to determine veiling glare may be used other than tracking objects and their corresponding image intensities relative to the other parameters mentioned. Other examples may include converting the image to an intensity histogram and providing the other parameters into a neural network. Alternatively, a neural network, which may incorporate convolutional, recurrent layers, attention mechanisms, etc., may be provided input such as images, intensity, light source orientation, and other parameters previously described. Such a neural network may output a map of the veiling glare magnitude over the image. The network may further provide a map of lens flare magnitude in the image, a corrected image without veiling glare, or other outputs (e.g. semantic segmentation map). In another example, the lens flare parameters may be output by the neural network to detect degradation of lens or sensor optics, e.g. failure of anti-reflective thin films.

In another embodiment, the controller 118 can be configured to use a histogram of the intensity and/or intensity gradients relative to the light source relative angle to determine the actions of veiling glare.

In general, the controller 118 can be configured to track changes in the relative reflective intensity of a single object or a plurality of objects detected in the area of interest 104. The veiling glare determination performed by the controller 118 could be an average of the relative reflective intensities across all objects or only a portion of the objects. Again, the changes in relative reflective intensity over time are made relative to the light source angle LA, and how the light source angle LA also changes over time.

Figure 3:
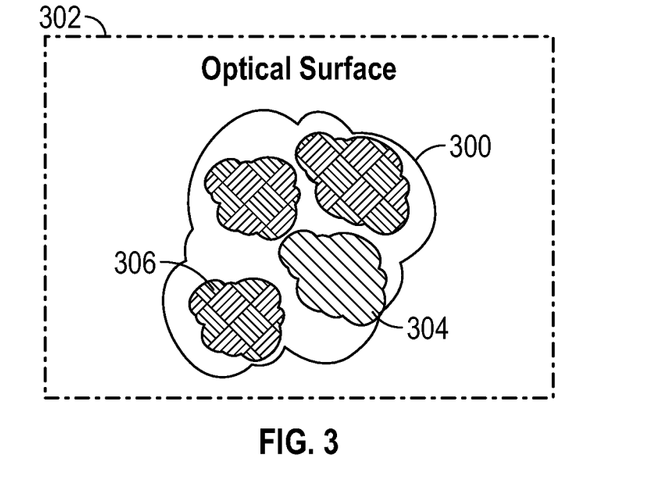
FIG. 3 schematically depicts obstructions or debris that produce variances of veiling glare or lens flare on an optical surface.

In some embodiments, the controller 118 can be configured to perform a pixel-level analysis on images obtained by the first image sensor 128 (see FIG. 3 as an example). Veiling glare that corresponds to an amount of diffuse lighting due to obstructions 126 on the optical surface 114 depends on the dust/obstruction level and the light source angle LA assuming that all other variables are held constant. Other variables or factors can include exposure, gain, object orientation in space relative lighting source, lighting level, dynamic range, multi-exposure settings, effects of LED flicker, and so forth. If these variables are present some corrections may be necessary. These corrections may include conversion of brightness value into luminosity or estimated object reflectivity in the scene. For example, an object such as a dark bumper may change the relative angle between the light source, the object's surfaces, and the camera due to vehicle motion, e.g. turning. Based on image intensity value or computed luminosity the object would appear suddenly brighter. In reality the increased brightness may fully explained due to Lambert's cosine law in which a radiant intensity observed from a diffuse surface is directly proportional to the cosine of the angle between the view angle and surface angle as well as changes in photon flux (assuming a dominant point light source such as the sun). As such the reflectivity will have remained constant and the perceived object brightness increase may fully be explained due to the aforementioned physics effects rather than additional light scattering due to a sudden increase in dust on the optics surface.

To be sure, the local position of objects as captured by the camera within the image frame may be a factor for non-uniform obstructions 126 on the optical surface 114. For example, another vehicle may travel in a perpendicular direction relative the observing camera mounted on the vehicle. The optics surface may have dust on one side of the optical path, e.g. the right half of the windshield in region of the optical path of the camera. This localized dust layer may not be easily directly detectable using computer vision techniques (this could be attributable to many reasons such as lack of features, being effectively translucent and out of focus). The object's image intensity, calculated luminosity, and estimate reflectivity may change as the object moves such that the position goes from the left side of the image where the optical surface is clean and to the right side of the image where the optical surface is locally dusty. In the case of a dark vehicle the pixels in image belonging to the vehicle over the image frames would increase in intensity and luminosity assuming other factors are held constant (e.g. location of light source relative angle to optical surface of camera). This effect would be due to the larger number of photons detected due to the light scattering from the dust layer on the optical surface relative to the number of photons reflected from the dark colored vehicle surface. This local position may be used by the controller 118 to identify average and local obstructions, such as per-each-pixel, levels due to spatially varying veiling glare. For example, in FIG. 3 (in combination with FIG. 1), an area of veiling glare 300 is present on an optical surface 302. This veiling glare 300 can be generally identified using the methods described herein (e.g., a function of relative intensities of objects (e.g., lightness/darkness) versus the light source angle LA over time). To determine more granular details regarding the obstruction or other causes of the veiling glare, the area of veiling glare 300 on the image can be further evaluated on a pixel-level. That is the controller 118 can identify an area 304 where the obstruction(s) is denser, versus areas 306 where the obstruction is less dense. As noted above, this difference results in spatially-varying veiling glare. The areas of greater obstruction density or thickness may create veiling glare that is greater than areas where the obstruction is less dense (e.g. more light is scattered on the optical surface). It should also be noted that all optical surfaces, even when free of obstructions and without degradation such as scratches, will create some amount of light scattering with respect to the light source relative angle. Additional obstructions and degradation of the optical surface will increase this light scattering. Stated succinctly, the controller 118 can be configured to determine variances in the veiling glare on the optical surface, as well as identify positions of obstructions on the optical surface based on the variances. The controller 118 can determine variances based on changes to any of an offset, a magnitude, or a functional form of the change in the relative reflective intensities of the objects.

In some embodiments, a curvature of the optical surface can be accounted for when making veiling glare determinations. That is, as the veiling glare is a function of the light source angle LA, differences in light source angle LA due to curvature in the optical surface may cause a change in veiling glare that is not due to variations in obstruction amount. The controller 118 can compensate for these variations in light source angle LA, in some embodiments.

It will be understood that veiling glare levels may have a characteristic curvature where the obstruction levels may affect an offset, magnitude, and/or functional form of the change in relative object intensities. This curve may be measured in a lab or on a road test with known levels of obstruction (e.g. dust) on the optical surface. As such, a curve or relative change in performance may be normalized to a known obstruction level(s) by the controller 118. Additionally, lens flare changes may be correlated with lab tests. For example, a lens may be measured in its nominal state and after removal of an anti-reflective coating to measure the increase or change in lens flare relative to light source relative orientation.

According to some embodiments, the veiling glare can be affected by the presence of fog in the area of interest 104. Thus, in some embodiments, the vehicle 102 can comprise a humidity sensor 138 that obtains data that can be analyzed for the presence of fog. A temperature sensor could also be utilized in some embodiments to indicate the likely presence of fog. In other embodiments, fog in the area of interest 104 can be determined by the controller 118 obtaining weather-related data from a weather service 144. The controller 118 can access the weather service over the network 115 through its communications interface 120 or over a V2X (vehicle-to-everything) connection.

Once veiling glare has been detected, the controller 118 may be configured to activate a remediating measure in response to the veiling glare. A remediating measure could include activation of a cleaning assembly 140 of the vehicle 102. The cleaning assembly 140 could include, for example, a windshield wiper system of the vehicle 102 to include dispensing of windshield wiper fluid, as well as activation of windshield wipers. This remediating action may reduce veiling glare by removing at least a portion of the obstructions 126 on the optical surface 114. To be sure, any remaining obstructions may likely be indicative of permanent degradation of the optical surface 114.

In another example, the remediation action may include the controller 118 modifying of an attribute or parameter of an advanced driver assistance system 142 or an autonomous vehicle operation. By way of example, the advanced driver assistance system 142 may output an alert or message to a driver of the vehicle 102 that veiling glare is detected and that the driver should manually activate their windshield wipers to clean the optical surface. In another example, the advanced driver assistance system 142 may prevent the driver from merging towards a direction of the veiling glare. In another example, the advanced driver assistance system 142 may automatically reduce a speed of the vehicle 102 when veiling glare is detected. The vehicle may be stopped in some scenarios based on a magnitude of the veiling glare. Each of these options may also be executed by an autonomous vehicle function or controller. Also, rather than activation of a feature, the controller 118 could deactivate an ADAS feature and provide a message or warning to the driver of such a change. For example, the controller 118 can cause the ADAS to slow or stop the vehicle.

Also, the controller 118 can used veiling glare and lens flare functional form effect on an image to recover some of the original image quality for use in a display (rear backup camera) or in use in ADAS (removal of lens flare ghosting effects to reduce false positives in computer vision).

In some embodiments, the processes of determining veiling glare can be utilized to verify a cleaning procedure. For example, once the controller 118 has determined that veiling glare is present and has caused a cleaning operation to occur, the controller 118 can re-evaluate the presence of veiling glare on the optical surface subsequent to the cleaning operation to determine if the veiling glare has changed in magnitude. That is a magnitude of veiling glare is determined at a first point in time by the controller 118. The magnitude of the veiling glare is determined at a second or later point in time by the controller 118. As noted above, any remaining veiling glare may be caused by permanent damage to the optical surface.

Generally speaking, the controller can validate the efficacy of contaminate/obstruction removal by determining a change in the veiling glare after the removing of contaminants from the optical surface 114. When the magnitude of the veiling glare decreases from the first point in time to the second point in time, the cleaning procedure is determined to have had an impact on the veiling glare. The extent of this impact is represented by the percentage change in the magnitude of the veiling glare decreases from the first point in time to the second point in time. If no change has occurred in the magnitude of the veiling glare, it may be inferred by the controller 118 that an error has occurred in the cleaning assembly (e.g., inoperative windshield wipers or lack of washer fluid).

No change in the magnitude of the veiling glare may also indicate that the veiling glare is due to obstructions on the lens 132 of the first image sensor 128. An alert or message may be presented to the driver through a voice command system or other human-machine interface that the lens 132 of the first image sensor 128 should be inspected and cleaned. Subsequent determinations of changes in the magnitude of the veiling glare can be performed after each iterative step to determine if a root cause of the veiling glare has been detected and remediated. In instances where no root cause is identified or veiling glare cannot be remediated, the controller 118 may infer that the obstructions creating the veiling glare are structural in nature and related to the optical surface. For example, the optical surface may be scratched or pitted. Warning messages can also be that informs the driver that the optical surface may be damaged.

According to some embodiments, veiling glare may be an indication of coating degradation or failure. For example, after cleaning action with water-based spray it is expected that the traveling water droplets may remove dirt on a lens or a windshield. If the coating fails, the droplets may form a shallow water film that does not remove contamination as effectively. This represents another scenario in which the veiling glare is not mitigated through cleaning processes.

In one example use case, systems, devices, and methods of the present disclosure may be used for multiple camera types and configurations such as cameras mounted on an AV tiara (e.g., housing on top of a vehicle), forward-looking cameras mounted behind a windshield, rear view and side view cameras mounted on body exterior locations, or even interior/driver monitoring cameras. For example, a camera used to monitor the driver alertness may detect veiling glare of the rear glass surface of the hatch of the car/truck/SUV. When detected, the indication of veiling glare can be used to automatically activate cleaning of the rear glass.

As noted above, the controller 118 can be programmed with data obtained using control or lab testing. These data can be used as a benchmark. For example, a lab test may be used to correlate the severity of veiling glare with dirt obstruction level. This also may be correlated with none glaring negative effects such as blurring, a decrease in signal-to-noise ratio (SNR), a decrease in contrast detection probability (CDP), and/or a decrease in modulation transfer function (MTF) relative to the imaging capability of the camera.

As noted above the vehicle 102 can include the first image sensor 128 and a second image sensor 131. Output of these sensors can be used as a cross-check by the controller 118. That is, the root cause of veiling glare, such as a dust layer, may be localized on the lens or windshield may be localized. Often in AV applications, there are multiple cameras performing object detection and sensor fusion. Also, other sensor modalities that detect light can be used in addition to, or in lieu of images/photographs. To be sure, the methods disclosed may be adapted for use using on other sensor modes (LIDAR, TOF-cameras) where ambient illumination may be imaged or may be included into an equation to measure range. Also dust may act to lower the range of the sensors or deflect the LIDAR beam (active illumination) thus measuring the wrong angular position in space leading to depth estimation errors. The presence of veiling glare would reduce these sensors effectiveness. Methods disclosed herein can be used to detect such failure modes as dust on a LIDAR housing using the ambient imaging mode of some LIDAR/TOF camera.

It would be expected that the veiling glare would lower the signal to noise ratio or contrast detection probability of that region of the camera's field of view reducing the chance of detection, correct detection classification, or misclassification. Objects detected or not detected (relative to other overlapping image sensors 128/132) in the camera's field of view which presently has a dust layer detected by the veiling glare method may be discounted (or in some embodiments eliminated) and other sensors detection of objected may be elevated compared to nominal sensor operations during sensor fusion.

That is, the second image sensor 131 can be used to tracks a first object within the area of interest. The controller 118 can be configured to ignore images provided by the second image sensor 131 when the first object is not detected in the images produced by the second image sensor 131 but the first object is detected in the images of the area of interest by obtained by the first image sensor 128. When more images sensors are present, additional confidence can be gained through a plurality of images provided by multiple images sensors. When objects are present in only certain images, the controller 118 can infer that the position of some of an image sensor is such that the object is not present in the images created by the image sensor, or that an error condition is present with respect to the image sensor.

The features of the present disclosure can be applied to specific scenarios, such as when the image sensor(s) include LIDAR. For example, when veiling glare increases due to duet on a LIDAR housing in combination with the position of the Sun (e.g., light source angle) may raise a noise floor of the LIDAR sensor. This would reduce the signal-to-noise (SNR) and detection capability at farther distances. The controller 118 can be configured to determine a lighting source position any disclosed method herein (other sensors or knowledge of vehicle orientation, time of day, the position of the Sun, and so forth). A noise floor determination may be performed per each position of the housing of the LIDAR relative to the light source angle of the light source. Such an application of the present disclosure may detect contamination on the LIDAR housing (e.g. dust) and allow activation of cleaning systems.

Figure 4A:
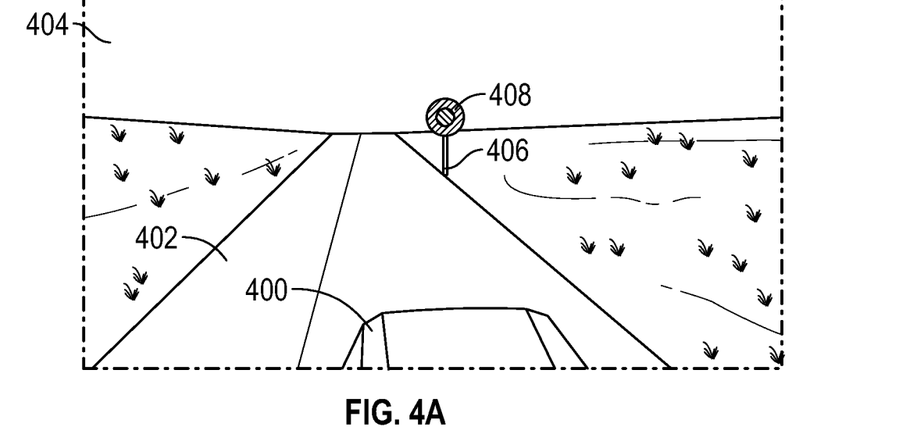
FIGS. 4A-4C collectively depict veiling glare of lens flare detection according to the present disclosure in a nighttime setting.
Figure 4B:
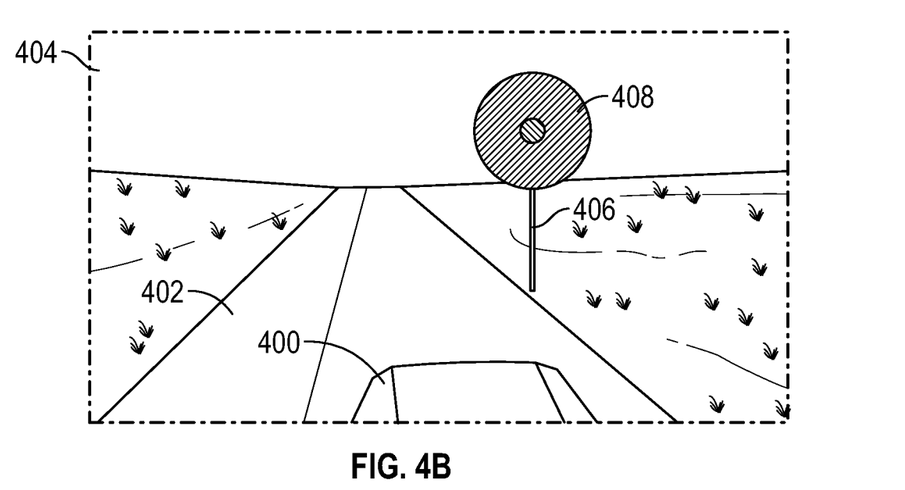
Figure 4C:
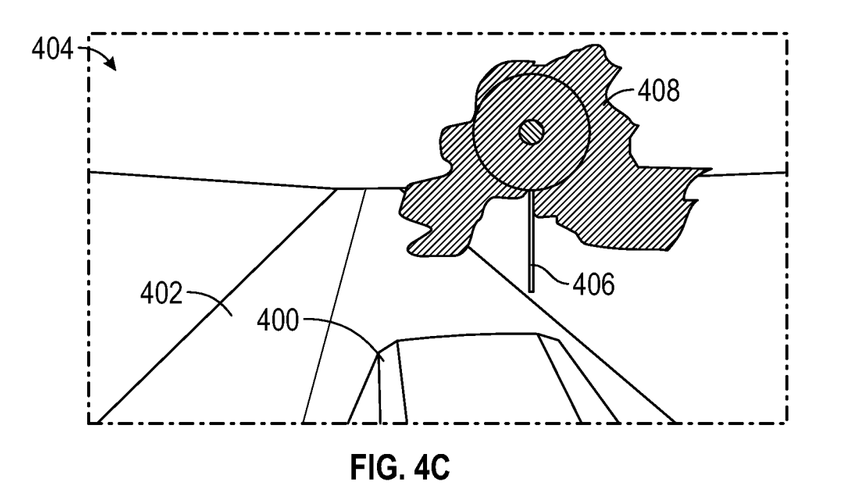

Veiling glare detection can also be applied during night time driving operations. Turning now to FIGS. 4A-4C, which collectively illustrate an environment where veiling glare may be detected during night time driving operations. In FIG. 4A, a vehicle 400 is traveling along a road 402 at night, with a dark sky region 404 present. A streetlight 406 (or other similar light sources), is present and illuminating a portion of the road 402. Generally, the streetlight 406 generates a flare region 408 due to lens flare and obstructions present on a windshield of the vehicle 400.

As the vehicle 400 approaches the streetlight 406 in FIG. 4B, the flare region 408 of the streetlight 406 becomes larger due to a change in an angle of incidence (e.g., light source angle) between the streetlight 406 and the windshield of the vehicle 400. The increase in the flare region 408 may also be due, in part to obstructions on the windshield of the vehicle 400. As the vehicle 400 gets even closer to the streetlight 406 in FIG. 4C, the flare region 408 further increases and becomes more irregular in shape. This change in magnitude/shape of the flare region 408 is based on further changes in the angle of incidence (e.g., light source angle) between the streetlight 406 and the windshield of the vehicle 400. In some embodiments, a gradient of the flare region 408 may be measured per pixel and relative to a distance from the streetlight 406 and the angle of incidence (e.g., light source angle).

Some embodiments disclose that the veiling glare detection and remediation processes are performed at the controller level. Other embodiments can include the service provider 112 performing the veiling glare detection and/or remediation processes. In some embodiments, the veiling glare detection methods disclosed herein are performed by the service provider 112, while the remediation measures are implemented at the vehicle level through the controller 118. Broadly, the controller 118 can obtain and forward images to the service provider 112. The service provider 112 can process the images to detect veiling glare. When veiling glare is detected, the service provider 112 can transmit a message/signal to the controller 118 to activate a remediating measure.

Figure 5:
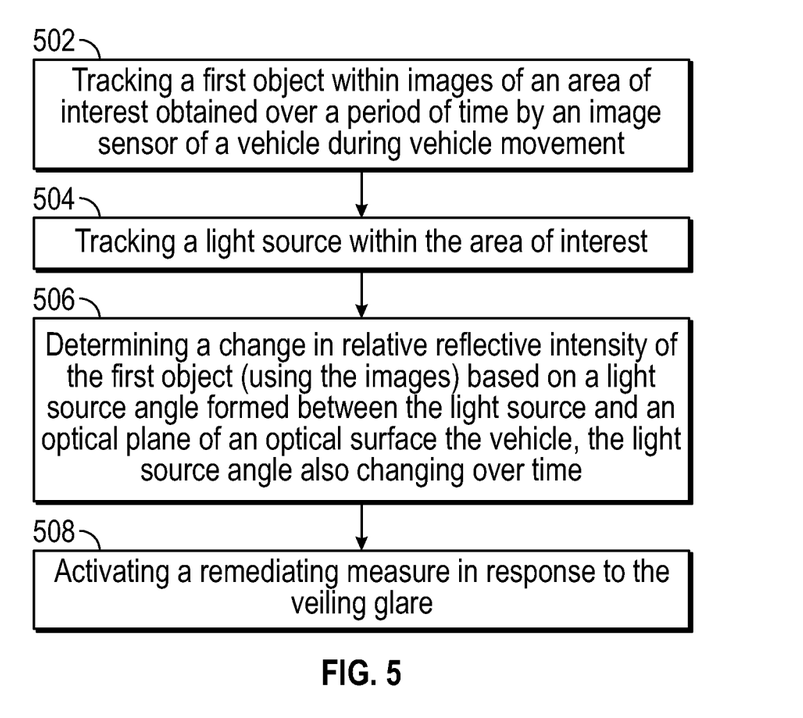
FIG. 5 is a flowchart of an example method of the present disclosure that includes veiling glare or lens flare detection and remediation.

FIG. 5 is a flowchart of an example method of the present disclosure. The method generally includes a step 502 of racking a first object within images of an area of interest obtained over a period of time by an image sensor of a vehicle during vehicle movement. To be sure, multiple objects may be tracked over the same period of time using one or more image sensors.

Next, the method includes a step 504 of tracking a light source within the area of interest. The tracking of the light source (such as the Sun or a streetlight) can be accomplished using the images, or from positional data of the vehicle. For example, known a time of day, a heading of the vehicle, and a location of the vehicle, a position of the Sun can be determined.

According to some embodiments, the method can include a step 506 of determining a change in relative reflective intensity of the first object based on a light source angle formed between the light source and an optical plane of an optical surface the vehicle. To be sure, this process can include determining changes in the light source angle formed between the light source and the optical plane over the period of time. Indeed, the change in relative reflective intensity is indicative of veiling glare of the optical surface. In response to determining that veiling glare exists, the method can include a step 508 of activating a remediating measure in response to the veiling glare. As noted above, the remediating measure can comprise activating a cleaning assembly of the vehicle to reduce the veiling glare by removing contaminants from the optical surface.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
    tracking a first object within images of an area of interest obtained over a period of time by an image sensor of a vehicle during vehicle movement;
    tracking a light source within the area of interest;
    determining a change in relative reflective intensity of the first object using the images, based on a light source angle formed between the light source and an optical plane of an optical surface the vehicle, the change in relative reflective intensity being indicative of veiling glare or lens flare of the optical surface; and
    activating a remediating measure in response to the veiling glare or lens flare.

2. The method according to claim 1, further comprising determining changes in the light source angle over the period of time.

3. The method according to claim 1, further comprising detecting fog within the area of interest.

4. The method according to claim 1, further comprising tracking a second object, the second object having a relative reflective intensity that is different from the relative reflective intensity of the first object.

5. The method according to claim 4, further comprising:
    determining variances in the veiling glare on the optical surface; and
    identifying positions of obstructions on the optical surface based on the variances.

6. The method according to claim 5, wherein the variances are determined based on changes to any of an offset, a magnitude, or a functional form of the change in the relative reflective intensities of the first object and the second object.

7. The method according to claim 1, wherein the remediating measure comprises activating a cleaning assembly of the vehicle to reduce the veiling glare by removing contaminants from the optical surface.

8. The method according to claim 7, further comprising validating efficacy of the contaminate removal by determining a change in the veiling glare after the removing of contaminants from the optical surface.

9. The method according to claim 1, wherein the remediating measure comprises altering a parameter of an advanced driver assistance system or an autonomous vehicle operation.

10. A device, comprising:
    a processor; and
    a memory for storing instructions, the processor is configured to execute the instructions to:
    track a first object within images of an area of interest obtained over a period of time by an image sensor of a vehicle during vehicle movement;
    track a light source within the area of interest;
    determine a change in relative reflective intensity of the first object based on a light source angle formed between the light source and an optical plane of an optical surface the vehicle, the change in relative reflective intensity being indicative of veiling glare of the optical surface; and
    activate a remediating measure in response to the veiling glare.

11. The device according to claim 10, wherein the processor models lens flare using the veiling glare.

12. The device according to claim 10, wherein the processor is further configured to detecting fog within the area of interest based on any of a humidity sensor of the vehicle or weather data received from a weather data service over a network.

13. The device according to claim 10, wherein the processor is further configured to:
    determine variances in the veiling glare on the optical surface; and
    identify positions of obstructions on the optical surface based on the variances.

14. The device according to claim 13, wherein the processor determines variances based on changes to any of an offset, a magnitude, or a functional form of the change in the relative reflective intensities of the first object and a second object.

15. A system, comprising:
    a sensor assembly that:
    tracks a first object within images of an area of interest obtained over a period of time by an image sensor of a vehicle during vehicle movement;
    tracks a light source within the area of interest; and
    determines changes in a light source angle over the period of time; and a controller having a processor and memory, the processor being configured to execute instructions stored in memory to:

determine a change in relative reflective intensity of the first object based on the light source angle formed between the light source and an optical plane of an optical surface the vehicle, the change in relative reflective intensity being indicative of veiling glare of the optical surface; and activate a remediating measure in response to the veiling glare.

16. The system according to claim 15, further comprising wherein the sensor assembly is further configured to detect fog within the area of interest.

17. The system according to claim 15, wherein the processor is configured to track a second object, the second object having a relative reflective intensity that is different from the relative reflective intensity of the first object.

18. The system according to claim 15, wherein the sensor assembly further comprises a light detection and ranging (LIDAR) device, further wherein the processor is further configured to calculate a noise floor for various positions of a housing of the LIDAR device relative to the light source angle.

19. The system according to claim 15, wherein the remediating measure comprises the processor being further configured to activate a cleaning assembly of the vehicle to remove contaminants from the optical surface.

20. The system according to claim 15, wherein the sensor assembly is further configured to track the first object within the area of interest using a first image sensor, further wherein the processor is configured to ignore images provided by a second image sensor when the first object is not detected in the images but the first object is detected in the images of the area of interest by obtained by the first image sensor.

* * * * *